US008180658B2

(12) United States Patent
Hamadi et al.

(10) Patent No.: US 8,180,658 B2
(45) Date of Patent: May 15, 2012

(54) EXPLOITATION OF WORKFLOW SOLUTION SPACES TO ACCOUNT FOR CHANGES TO RESOURCES

(75) Inventors: Youssef Hamadi, Cambridge (GB); Claude-Guy Quimper, Quebec (CA)

(73) Assignee: Microsoft Corporation, Redmond, WA (US)

( * ) Notice: Subject to any disclaimer, the term of this patent is extended or adjusted under 35 U.S.C. 154(b) by 1183 days.

(21) Appl. No.: 11/669,064

(22) Filed: Jan. 30, 2007

(65) Prior Publication Data

US 2008/0183517 A1    Jul. 31, 2008

(51) Int. Cl.
G06Q 10/00    (2012.01)
(52) U.S. Cl. ..................................... 705/7.11; 705/7.13
(58) Field of Classification Search ................. 705/7.11, 705/7.13
See application file for complete search history.

(56) References Cited

U.S. PATENT DOCUMENTS

| | | | |
|---|---|---|---|
| 5,799,297 A | 8/1998 | Goodridge et al. | |
| 5,826,239 A | 10/1998 | Du et al. | |
| 5,890,133 A | 3/1999 | Ernst | |
| 6,115,646 A | 9/2000 | Fiszman et al. | |
| 6,308,163 B1 | 10/2001 | Du et al. | |
| 6,397,192 B1 | 5/2002 | Notani et al. | |
| 6,415,259 B1 * | 7/2002 | Wolfinger et al. | 705/7.13 |
| 6,772,407 B1 | 8/2004 | Leymann et al. | |
| 6,817,008 B2 | 11/2004 | Ledford et al. | |
| 6,832,201 B1 | 12/2004 | Leymann et al. | |
| 6,850,895 B2 * | 2/2005 | Brodersen et al. | 705/9 |
| 6,938,240 B2 * | 8/2005 | Charisius et al. | 717/104 |
| 7,035,808 B1 * | 4/2006 | Ford | 705/7.14 |
| 7,062,537 B2 | 6/2006 | Aziz et al. | |
| 7,146,353 B2 * | 12/2006 | Garg et al. | 1/1 |
| 7,254,805 B2 | 8/2007 | Tibazarwa | |
| 7,406,475 B2 | 7/2008 | Dorne et al. | |
| 7,464,147 B1 | 12/2008 | Fakhouri et al. | |
| 7,676,034 B1 * | 3/2010 | Wu et al. | 379/265.01 |
| 2002/0013631 A1 | 1/2002 | Parunak et al. | |
| 2002/0029161 A1 | 3/2002 | Brodersen et al. | |
| 2002/0107914 A1 | 8/2002 | Charisius et al. | |
| 2002/0152305 A1 | 10/2002 | Jackson et al. | |
| 2002/0161859 A1 | 10/2002 | Willcox et al. | |
| 2002/0170035 A1 | 11/2002 | Casati et al. | |

(Continued)

OTHER PUBLICATIONS

Michael zur Muehlen: Organizational Management in Workflow Applications. Information Technology and Management Journal. Kluwer Academic Publishers, 5 (2004) 3, pp. 271-291.*

(Continued)

*Primary Examiner* — Mark Fleischer
(74) *Attorney, Agent, or Firm* — Lee & Hayes, PLLC

(57) ABSTRACT

It is difficult for managers or other operators to decide how best to modify an available pool of resources used for their workflows. Methods for achieving this by improving the robustness of workflows are described. The more robust a workflow, the better its ability to withstand detrimental changes to its associated pool of resources. It is recognized here that the size of the solution space for the problem of allocating resources to tasks in a workflow provides a useful indicator of robustness of a workflow. In general, the greater the size of the solution space the more robust the workflow. A constraint optimization problem is specified for the problem of how best to modify resource characteristics of a pool of resources in order to maximize a size of a solution space. The solution space is that for the problem of allocating resources from the pool to tasks in a workflow.

16 Claims, 13 Drawing Sheets

U.S. PATENT DOCUMENTS

| | | | |
|---|---|---|---|
| 2002/0184176 | A1 | 12/2002 | Fromherz et al. |
| 2003/0149714 | A1 | 8/2003 | Casati et al. |
| 2003/0200527 | A1 | 10/2003 | Lynn et al. |
| 2004/0010519 | A1 | 1/2004 | Sinn et al. |
| 2004/0046787 | A1 | 3/2004 | Henry et al. |
| 2004/0078373 | A1 | 4/2004 | Ghoneimy et al. |
| 2004/0078778 | A1 | 4/2004 | Leymann et al. |
| 2004/0083448 | A1 | 4/2004 | Schulz et al. |
| 2004/0111430 | A1 | 6/2004 | Hertling et al. |
| 2004/0148214 | A1 | 7/2004 | Aziz et al. |
| 2004/0179528 | A1 | 9/2004 | Powers et al. |
| 2004/0193678 | A1 | 9/2004 | Trufinescu et al. |
| 2004/0260576 | A1 | 12/2004 | Wang et al. |
| 2005/0027495 | A1 | 2/2005 | Matichuk |
| 2005/0027585 | A1 | 2/2005 | Wodtke et al. |
| 2005/0071209 | A1 | 3/2005 | Tatavu et al. |
| 2005/0096959 | A1 | 5/2005 | Kumar et al. |
| 2005/0096962 | A1* | 5/2005 | Narasimhan et al. ............. 705/9 |
| 2005/0149908 | A1 | 7/2005 | Klianev |
| 2005/0171930 | A1 | 8/2005 | Arning et al. |
| 2005/0193286 | A1 | 9/2005 | Thatte et al. |
| 2006/0002540 | A1* | 1/2006 | Kreiner et al. ........... 379/265.02 |
| 2006/0101052 | A1 | 5/2006 | Netrakanti et al. |
| 2006/0109961 | A1 | 5/2006 | Mahesh et al. |
| 2006/0136279 | A1 | 6/2006 | Maybee et al. |
| 2006/0173724 | A1 | 8/2006 | Trefler et al. |
| 2006/0190944 | A1* | 8/2006 | Moon et al. ................... 718/104 |
| 2006/0224432 | A1 | 10/2006 | Li |
| 2007/0005414 | A1* | 1/2007 | Connors et al. ................... 705/9 |
| 2008/0134193 | A1 | 6/2008 | Corley et al. |
| 2009/0228309 | A1 | 9/2009 | Moll |

OTHER PUBLICATIONS

Minhong Wang, William Cheung, Jiming Liu, Xiaofeng Xie, and Zongwei Luo. "Service/Process Composition Through Multi-agent Constraint Management." in Business Process Management, Lecture Notes in Computer Science, 2006, Springer Berlin/Heidelberg, http://dx.doi.org/10.1007/11841760_19, DOI:10.1007/11841760_19.*

Rainer Kolisch, Sonke Hartmann, Experimental investigation of heuristics for resource-constrained project scheduling: An update, European Journal of Operational Research, vol. 174, Issue 1, Oct. 1, 2006, pp. 23-37, ISSN 0377-2217, DOI: 10.1016/j.ejor.2005.01.065.*

Zhijiao Xiao, Huiyou Chang, and Yang Yi."Optimization of Workflow Resources Allocation with Cost Constraint" in Computer Supported Cooperative Work in Design III, Lecture Notes in Computer Science, 2007, Springer Berlin / Heidelberg, vol. 4402, 647-656, URL: http://dx.doi.org/10.1007/978-3-540-72863-4_66, DOI:10.1007/978-3-540-72863-4_66.*

Alonso, et al., "Process Synchronization in Workflow Management Systems", available at least as early as Nov. 27, 2006, at <<http://www.inf.ethz.ch/personal/iks/publications/files/spds97.ps>>, pp. 1-8.

Attie, et al., "Scheduling Workflows by Enforcing Intertask Dependacies", Nov. 22, 1996, pp. 1-37.

Blythe, et al., "Task Scheduling Strategies for Workflow-based Applications in Grids", available at least as early as Nov. 27, 2006, at <<http://pegasus.isi.edu/pegasus/publications/ccgrid05-correction.pdf>> pp. 1-9.

Cao, et al., "GridFlow: Workflow Management for Grid Computing", available at least as eary as Nov. 27, 2006, at <<http://www.dcs.warwick.ac.uk/research/hpsg/documents/CaoJ.CCGrid_paper.pdf>>, pp. 1-8.

Crampton, et al., "A Reference Monitor for Workflow Systems with Constrained Task Execution", SACMAT '05, Jun. 1-3, 2005, Stokkholm, Sweden, pp. 1-10.

Han, et al., "A Taxonomy of Adaptive Workflow Management", Nov. 28, 2006, at <<http://lsdis.cs.uga.edu/lib/download/HSB98.html>>, pp. 1-4.

Patil, et al., "Cross Organizational Workflow Management Systems", available at least as early as Nov. 27, 2006, at <<http://www.tcs.com/0_whitepapers/htdocs/engineering/COWfM_systems_PDT_paper.pdf>>, pp. 1-9.

Purvis, et al., "An Adaptive Distributed Workflow System Framework", available at least as early as Nov. 27, 2006, at <<http://www.business.otago.ac.nz/infosci/pubs/papers/papers/dp2000-12.pdf, OTAGO, pp. 1-10.

Reichert, et al., "Enterprise-Wide and Cross-Enterprise Workflow Management: Challenges and Research Issues for Adaptive Workflows", available at least as early as Nov. 27, 2006, at <<http://www.informatik.uni-ulm.de/dbis/01/dbis/downloads/RBD99.pdf>>, pp. 1-9.

Schwiegelshohn, et al., "Resource Management for Future Generation Grids", available at least as eary as Nov. 27, 2006, at <<http://www.coregrid.net/mambo/images/stories/TechnicalReports/tr-0005.pdf>>, CoreGird, pp. 1-10.

Senkul, et al., "A Logical Framework for Scheduling Workflows Under Resource Allocation Constraints", Proceedings of the 28th VLDB, Hong Kong, CN, 2002, pp. 1-12.

Senkul, et al., "An Architecture for Workflow Scheduling Under Resource Allocation Constraints", Mar. 4, 2004, Elsevier Ltd, 2004, pp. 1-24.

Senkul, et al., "An Architecture for Workflow Scheduling Under Resource Allocation Constraints", Nov. 28, 2006, at <<http://portal.acm.org/citation.cfm?id=1077800.1077804&coll=&dl=acm&CFID=15151515&CFTOKEN=6184618>>, ACM Inc, 2006, pp. 1-5.

Rajakumar et al., "Workflow Balancing in Parallel Machine Scheduling and Precedence Constraints using Genetic Algorithim", 2006, Journal of Manufacturing Technology Management, vol. 17, No. 3, pp. 239-254.

Office Action for U.S. Appl. No. 11/669,082, mailed on Apr. 1, 2011, Youssef Hamadi, "Synchronizing Workflow," 29 pages.

Office Action for U.S. Appl. No. 11/669,098, mailed on Apr. 1, 2011, Youssef Hamadi, "Allocating Resources to Tasks in Workflows," 16 pages.

Non-Final Office Action for U.S. Appl. No. 11/669,098, mailed on Oct. 5, 2011, Youssef Hamadi, "Allocating Resources to Tasks in Workflows," 22 pages.

* cited by examiner

|  | T1 | T2 | T3 | T4 | T5 |
|---|---|---|---|---|---|
| Chemical | 5 | 0 | 0 | 0 | 0 |
| Electronic | 5 | 0 | 6 | 0 | 4 |
| Mechanical | 5 | 0 | 0 | 0 | 1 |

| Resources | Chemical | Electronic | Mechanical |
|---|---|---|---|
| Julie | 5 | 2 | no |
| Paul | 8 | 6 | 5 |
| Tom | 5 | no | no |

EXPLOITATION OF WORKFLOW SOLUTION SPACES TO ACCOUNT FOR CHANGES TO RESOURCES

BACKGROUND

Workflows are currently used to describe methods or processes in many fields such as job-shop scheduling, enterprise resource planning (ERP), customer relationship management (CRM), document lifecycle management, business process management and the like. A workflow is often represented as a flowchart for example and comprises a collection of tasks and specified as order (or at least a partial order) for carrying out the tasks. A workflow may also comprise conditions for invoking tasks and typically resources or sets of resources are pre-assigned for each task. Those resources may be factory equipment for example in the case of job-shop scheduling or may be any other resource including human agents. Workflow engines are used to control execution of specified workflows and determine when a process is ready to move to a next step.

Windows Workflow Foundation (trade mark) provided as part of the .NET Framework 3.0 is a technology for defining, executing and managing workflows. This enables a workflow such as a flowchart model to be instantiated as part of a program runtime. In Windows Workflow Foundation workflows comprise activities which may be tasks to be completed by a human or machine. For example, "send goods" might be an activity in a business process. Resources or sets of resources are pre-assigned for each activity.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

It is difficult for managers or other operators to decide how best to modify an available pool of resources used for their workflows. Methods for achieving this by improving the robustness of workflows are described. The more robust a workflow, the better its ability to withstand detrimental changes to its associated pool of resources. It is recognized here that the size of the solution space for the problem of allocating resources to tasks in a workflow provides a useful indicator of robustness of a workflow. In general, the greater the size of the solution space the more robust the workflow. A constraint satisfaction problem is specified for the problem of how best to modify resource characteristics of a pool of resources in order to maximize a size of a solution space. The solution space is that for the problem of allocating resources from the pool to tasks in a workflow.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
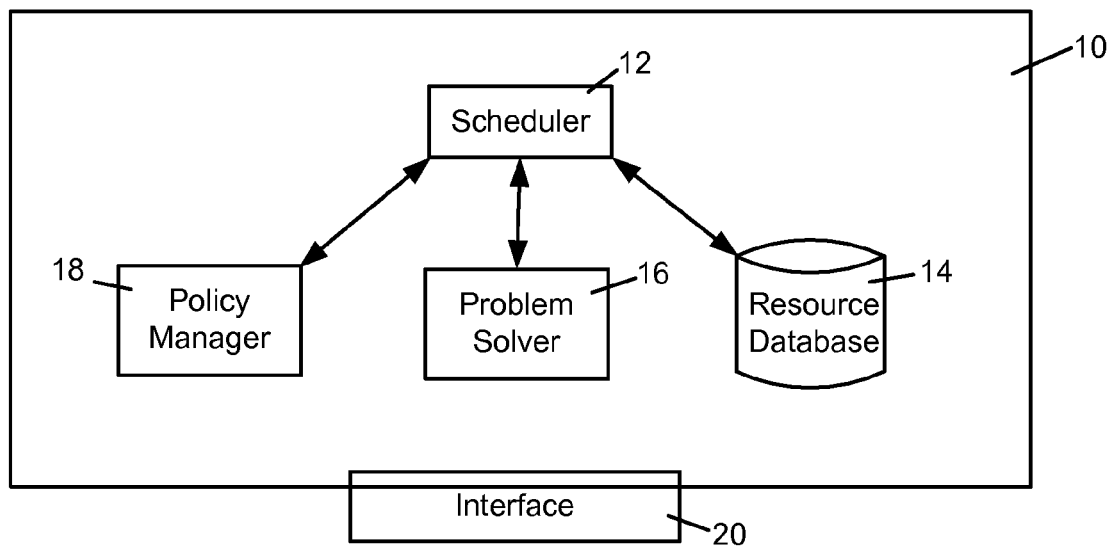
FIG. 1 is a schematic diagram of a workflow engine.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a business process management system, the system described is provided as an example and not a limitation. As those skilled in the art will appreciate, the present examples are suitable for application in a variety of different types of workflow enabled systems included but not limited to: job-shop scheduling systems, enterprise resource planning systems, customer relationship management systems, document lifecycle management systems, and page flow systems in user interfaces.

Pinar Senkul and Ismail Toroslu describe a process for allocating resources to tasks in workflows using a framework which integrates concurrent transaction logic with constraint logic programming. This is described in their 2002 paper "A Logic Framework for Scheduling Workflows Under Resource Allocation Constraints" Proceedings of the 28th VLDB Conference, Hong Kong, 2002 and also in "An Architecture for workflow scheduling user resource allocation constraints" Information Systems 2005 399-422. However, their framework is not practical for many types of workflows such as business workflows because it operates for offline scheduling problems. In contrast, for the systems described herein, resource allocation is integrated to the workflow engine. This enables resources to be allocated on-the-fly, taking into account the latest and most accurate context.

Previous workflow engines have typically used definitions of workflows with tasks having pre-assigned resources or resources computed by earlier tasks in the workflow. Also, previous workflow engines have typically used if-then rules and conditions to specify and control execution of tasks in the workflow. In contrast, the methods described herein use constraint programming techniques.

Constraint programming techniques involve stating relations between variables in the form of constraints. A constraint optimization problem may be stated as a number of unknown variables comprising a state of the world. A problem solver searches for possible solutions to the constraint optimization problem by searching for values for all the variables. A large number of constraints are specified (for example, there may be tens of thousands of constraints over thousands of variables). The constraints are embedded in a host programming language of any suitable type. For example, a logic programming language such as Prolog or by using a separate library in conjunction with an imperative programming language such as C++ or Java (trade mark).

Problem solvers which use constraint programming techniques to provide solutions to planning, scheduling and configuration problems are known and are currently commercially available. For example, the constraint programming engines provided by Ilog, Inc (trade mark). These types of problem solvers are used to help organizations make better plans and schedules. For example, to plan production at a manufacturing plant, plan workforce schedules, plan truck loading, set routes for delivering goods or services, deciding when to release seats or hotel nights at a lower price, determining a optimal number of trades to bring a stock index fund back into compliance and many other applications.

Constraint programming problem solvers are often provided with a pre-defined library of generic constraints which may be used to express a large variety of combinatorial problems. The action of constraints on variables is called constraint propagation. Constraint propagation is a self stabilizing process which interleaves calls to constraints and variable objects. At each step, a constraint does some reasoning which can reduce some variable's value set. This reduction is then propagated to related constraints which may then prune related variables' values.

In most cases, propagations are unable to find global solutions where each variable owns a unique value consistent with associated constraints. In order to address this, the problem solver may comprise various algorithms which perform depth-first or other types of search to explore the search space. These algorithms successively try alternatives by heuristically selecting some tentative value for some variable. Each selection is then propagated to the whole problem using constraint propagation. Backtracking may be used in the case of refutation of the tentative value.

In the examples described herein, the specification of workflows is addressed as a constraint optimization problem. In this way, execution of a workflow becomes a type of online optimization problem. This differs from much earlier work on workflows where if-then rules and conditions are used in association with tasks in a workflow, where the tasks have pre-assigned resources. By using a constraint optimization approach it becomes possible to simply and effectively specify a constraint optimization problem which enables all possible combinations for a workflow (for example, in terms of allocating resources to tasks) to be potentially considered. In contrast, for classical workflow engines using if-then rules and similar conditions it is often difficult to capture all possible combinations for a workflow in a simple manner.

According to an example, a workflow engine is provided as described in more detail below with reference to FIG. 1. The workflow engine represents a workflow using a plurality of specified tasks having at least a partial order. Each task is represented using an object or other suitable data structure comprising a plurality of associated constraint programming variables. At least some of these constraint programming variables are arranged to enable tasks to be allocated to resources at runtime. For example, these constraint programming variables may be required skills of human agents. In this way, it is not necessary to pre-assign resources to tasks as has previously been done in workflow engines. This gives greater flexibility and improves execution of the workflow. By allocating resources to tasks dynamically, or on-the-fly in this manner, better use of the resources can be made to achieve improved workflow execution and thus reduced costs and improved efficiency. On-the-fly allocation of tasks to the most suitable resources may then be made.

FIG. 1 is a schematic diagram of an example workflow engine 10. It comprises a scheduler 12 which is linked to a resource database 14 as well as to a problem solver 16 and a policy manager 18. The workflow engine 10 also comprises an interface 20. The scheduler 12 and problem solver 16 may be integral or separate and in communication with one another as illustrated in FIG. 1.

The resource database 14 is a memory or any other suitable data store holding information about resources for use during execution of workflows. The resources may be machines or humans. The information about these resources comprises resource characteristics of any suitable type. For example, in the case of a human resource, the characteristics may be skill levels for one or more technology areas or computer programming languages. In the case of a machine, the characteristics may be capabilities of the machine, functional limitations, processing speeds, or other characteristics. Information about resource characteristics may also comprises geographical location, costs, information about current tasks assigned to resources, details of when the resource will next become available or any combination of one or more such characteristics.

The problem solver 16 is a constraint programming problem solver of any suitable type. It is arranged to solve constraint optimization problems associated with workflow specification and execution.

The policy manager 18 comprises a memory or other data store holding information about user specified preferences for resource allocation. For example, this information may comprise weights to be applied during the resource allocation process. For example, the policy manager 18 may comprise information associated with a plurality of policies. Examples of such policies include but are not limited to:

load balancing—seek to spread workload evenly amongst resources skill refreshing—seek to ensure that human resources are allocated tasks with particular skill requirements on a regular basis minimize overskilled—avoid using resources which have greater capability or skill level than required for the particular task random—assign resources to available tasks in a random manner minimize workflow execution time—assign resources to tasks to reduce the expected time for execution of the workflow maximize quality—use the resources with the highest available skill levels minimize costs—use those resources which enable costs to be minimized tasks per time period—ensure that a resource is allocated no more than x tasks per day (or other specified time period).

This list of policies is in no way restrictive. As long as users find new ways to qualify the quality of a resource against another one with regard to a particular task, new policies may be defined.

The policy manager 18 also comprises functionality for applying any selected policy during workflow specification or execution via the scheduler 12.

Also provided is a scheduler 12 which is arranged to allocate resources to tasks using the problem solver 16. The scheduler 12 takes input from the policy manager 18 and resource database 14 to be taken into account in the resource allocation process. The scheduler 12 defines the process of allocating resources to tasks as a constraint programming problem and uses the problem solver 16 to find solutions.

The workflow engine 10 comprises an interface 20 which is arranged to receive information about a workflow to be specified and/or executed. This workflow comprises a plurality of specified tasks, each having specified required resource requirements. At least a partial order for the tasks in the workflow is given. This information is made available, for example, by a human operator, via the interface 20, to the scheduler 12 and the problem solver 16.

Figures 2A, 2B, 2C:
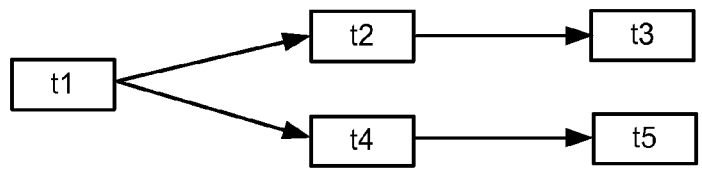
FIG. 2A is an example workflow.
FIG. 2B is an example of resource characteristic requirements for tasks of the workflow of FIG. 2A.
FIG. 2C is an example of information about resources stored at a resource database.

FIG. 2A is a schematic diagram of an example workflow 22. Information about such workflows may be provided as input to a workflow engine 10. The workflow comprises 5 tasks labeled t1 through t5 connected together to form a flow chart. In addition, the workflow comprises information about resource characteristics required for each task. This information may be provided as constraint programming variables embedded in task objects or other data structures representing tasks as mentioned above.

Thus the workflow does not comprise pre-assigned resources for each task as in earlier workflow engine. The human operator or other suitable entity makes available information about resource characteristics required for each task in any suitable manner. For example, a table may be used as illustrated in FIG. 2B. FIG. 2B shows a table having a column for each task and a row for each of three types of resource characteristic, chemical, electronic and mechanical in this example. For example, these types of resource characteristic may relate to technology areas for patent applications. Each task has a value for each technology area. For example, task 1 might be to review instructions from a client and negotiate business terms for work to prepare a patent application. Any resource used for this task is specified to need a skill level of 5 for each of chemical patent drafting and electrical and mechanical patent drafting. Task 2 might be to arrange a meeting with inventors to discuss the negotiated patent case. Any resource used for this task is specified to need a skill level of zero for chemical patent drafting and a zero skill level for electrical and mechanical patent drafting. Task 3 might be to carry out the meeting for an electronics case, requiring a skill level of 6 for electronic drafting. Task 4 might be to request a novelty search requiring a skill level of 4 for electronic drafting and 1 for mechanical drafting. The human operator or any other suitable entity also makes available information about resources and their associated characteristics via the interface 20 and these are stored in the resource database 14 as mentioned above. This information is not task specific; that is, information about tasks is not required in the resource database 14. FIG. 2C illustrates an example of such resource characteristic information suitable for use with the workflow of FIG. 2A. This information comprises a list of three resources, in this case, human workers, Julie, Paul and Tom and for each of those resources, a skill level associated with three different types of task. For example, the human workers may be patent attorneys. The patent attorneys have different skill levels in the different technology areas as indicated in FIG. 2C. For example, Julie has a skill level of 5 for chemical patent drafting and of 2 for electronic patent drafting but of zero for mechanical patent drafting.

The interface 20 may also provide facility for an operator to select particular policies in the policy manager 18 and to create new policies, delete policies or amend existing policies.

The interface 20 may also be arranged to communicate with resources to enable execution of the workflow and/or to receive information about the status of those resources. For example, suppose the scheduler allocates a task to Julie and identifies that the task is ready for execution. The scheduler may be arranged to send an email or other communication to Julie via interface 20 to request execution of the task. Any responses received from resources, for example, indicating that a task has been completed may be received via interface 20. In some embodiments the interface 20, rather than enabling direct communication with resources, is connected to an application or other entity for putting execution of the workflow into effect. For example, this might be a customer relationship management system, business process system or other suitable system as mentioned above.

Figure 3:
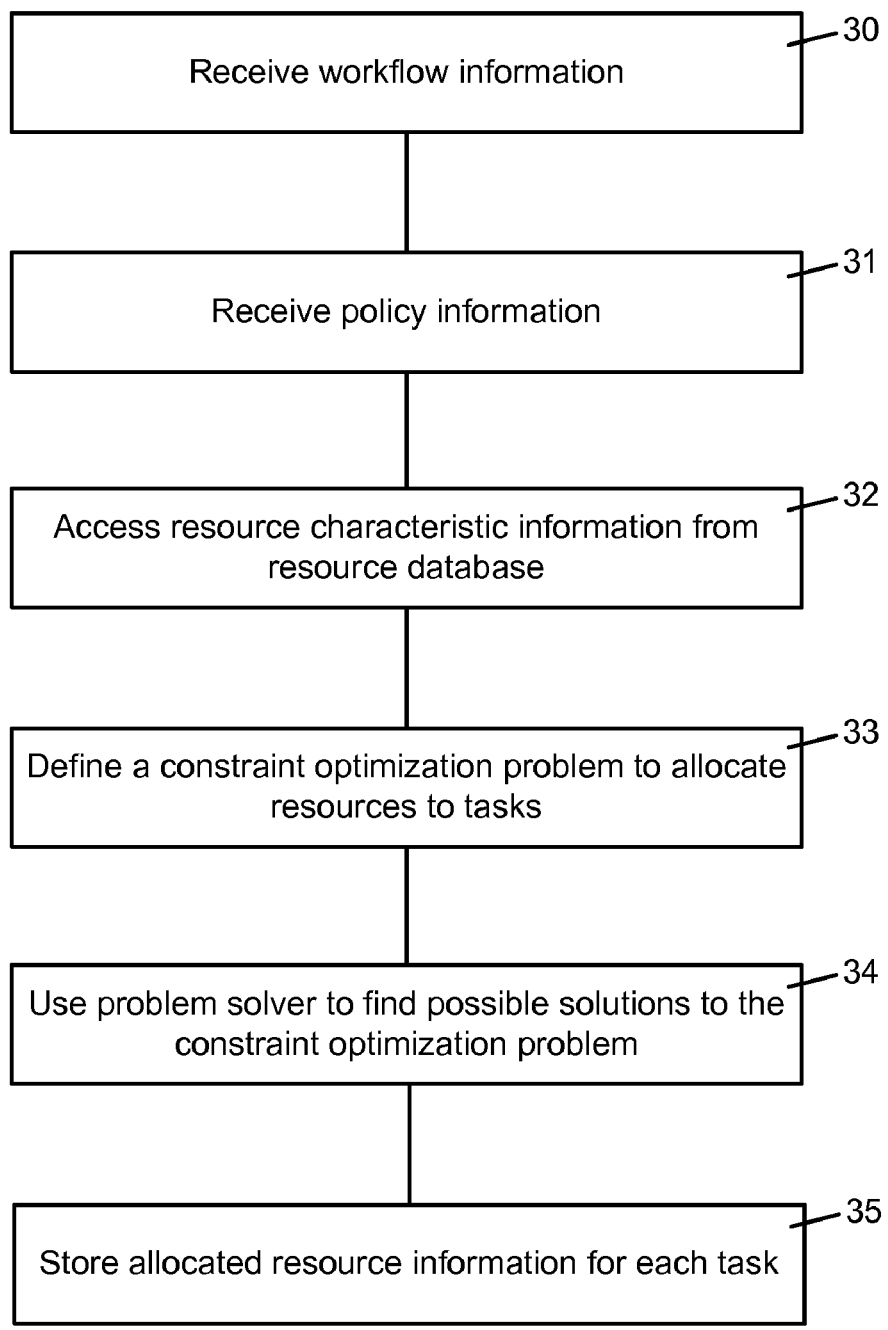
FIG. 3 is a flow diagram of a method at a workflow engine for allocating resources to tasks.

A method of dynamically allocating resources to tasks is now described with reference to the flow diagram of FIG. 3. At a workflow engine (such as 10 in FIG. 1) or at a scheduler (such as 12 in FIG. 1) workflow information is received (box 30). This comprises details of tasks to completed, at least a partial order for those tasks and information about resource characteristics required for each task. Policy information is then received (box 31) comprising information about any policies that it is required to take into account during resource allocation. Resource characteristic information is accessed (box 33) from a resource database. A constraint optimization problem is then defined (box 32) to allocate resources to tasks. This is done using the policy information, the workflow information and the resource database information. The policy information may be implemented as either hard constraints (which must be met) or soft constraints (which should be met as far as possible) or a combination of hard and soft constraints. The constraint optimization problem solution space comprises possible executions of the workflow. A constraint programming problem solver is then used to find possible solutions (box 34) to the constraint optimization problem. As a result resources may be allocated to tasks and this information is stored (box 35).

Figure 4:
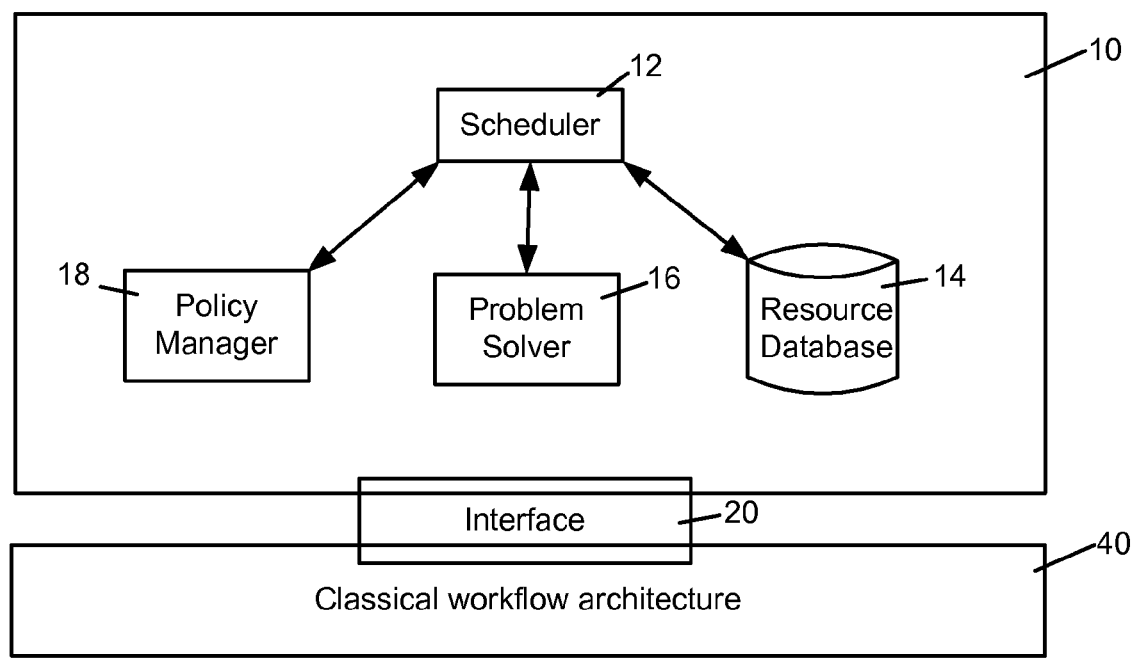
FIG. 4 shows a workflow engine connected to a workflow architecture.
Figure 5:
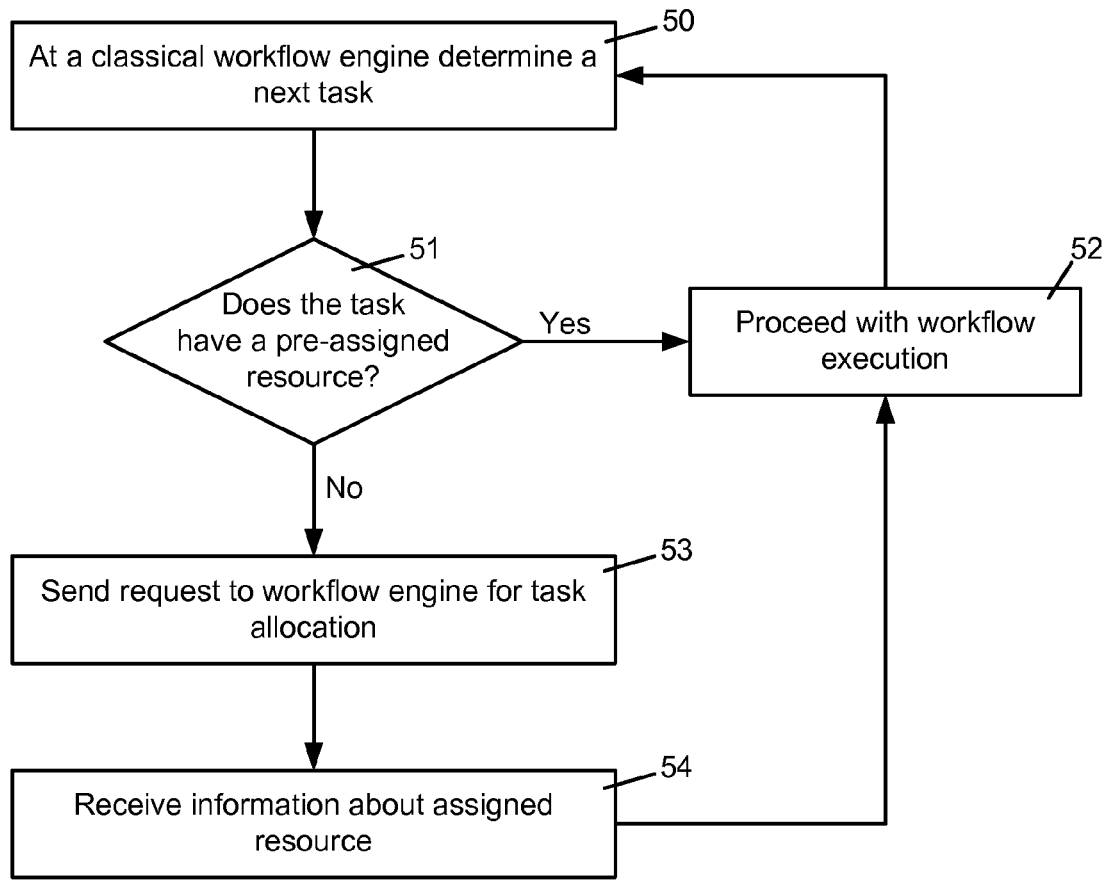
FIG. 5 is a flow diagram of a method of operation at the workflow architecture of FIG. 4.

In another embodiment the workflow engine 10 is integrated with a second workflow engine 40 (which does not use constraint programming techniques) as illustrated in FIG. 4. In this way, benefits of both approaches may be gained. This second workflow engine, also referred to as a classical workflow engine, is arranged to define workflows and to control the execution of workflows using if-then rules or other similar conditions. It is able to determine whether the workflow is ready to move to the next task. The classical workflow engine requires tasks to have pre-assigned resources. By integrating the classical workflow engine with a workflow engine 10 of the present case, it is possible to dynamically assign resources to tasks during execution of a workflow. This is now described with reference to the flow diagram of FIG. 5.

At a classical workflow engine a next task is determined (box 50) for example, using conventional workflow execution techniques. An assessment is then made as to whether that task has a pre-assigned resource (box 51). If it does, then the classical workflow engine proceeds with the workflow execution (box 52) using conventional workflow execution techniques. If no resource has been assigned, then a request is sent (box 53) to a workflow engine (10 in FIG. 4) having resource allocation ability. This request comprises information about the current state of the workflow and about the task concerned. The workflow engine having resource allocation ability returns information about an assigned resource (box 54) and the classical workflow engine proceeds with workflow execution (box 52).

When the request for resource allocation is received at the workflow engine 10 the scheduler 12 forms a constraint optimization problem as described above with reference to FIG. 3. This constraint optimization problem is formed on the basis of the current state of the workflow, the resource database information (including the current availability of the resources) and the policy manager information.

In this manner, resource allocation may be performed during workflow execution in a dynamic manner. It is thus not necessary to pre-assign resources to tasks in a workflow (although some tasks may have pre-assigned resources). Greater flexibility is achieved and better workflow execution performance may be achieved taking into account any policies defined in the policy manager. Greater accuracy can also be achieved by allocating resources just before a task has to be performed so that updated information on the resource characteristics and relative quality may be taken into account.

Figure 6:
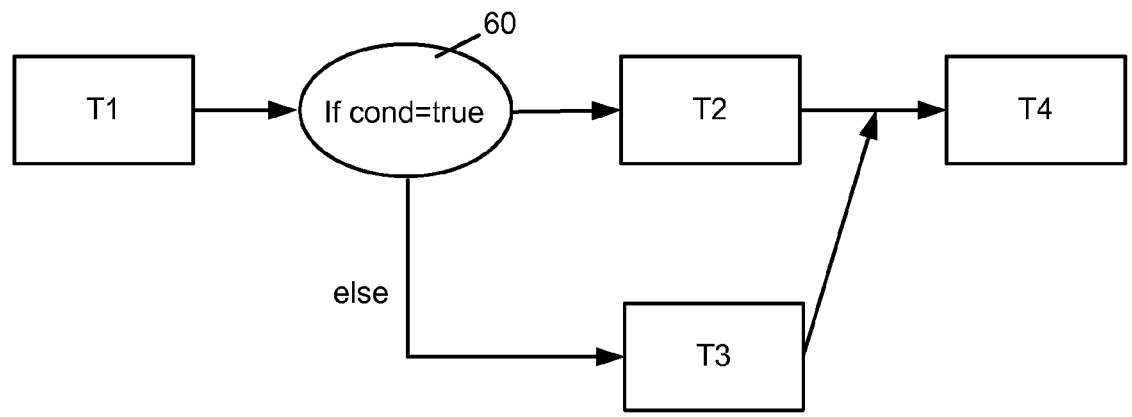
FIG. 6 shows an example workflow.

In another embodiment future tasks are taken into account when allocating resources to a current task. This is illustrated with respect to FIG. 6 which shows an example workflow having 4 tasks labeled T1 through T4. Suppose that T1 is the current task and that the workflow engine has allocated resource R1 to this task. In the future T4 will have to be performed and also either T2 or T3 depending on the state of the condition at decision point 60. Allocating R1 to T1 at the current time may have an impact on the quality of decisions for T2, T3 and T4. For example, R1 may be compatible with tasks T2, T3 and T4 and a better use of R1 may be achieved in some cases by allocating it to T4 and allocating a different resource to T1. In this example, there are two future scenarios, T2 to T4 and T3 to T4. In some embodiments the scheduler 12 is arranged to take such future scenarios into account when specifying the constraint optimization problem. The scheduler is arranged to determine all future branches in the current workflow up to a specified number of tasks. Information about these is then integrated into the constraint optimization problem to be solved by the problem solver. The number of future branches in the current workflow may be very high for some workflows and so to limit the computational complexity these future branches are only considered up to a specified depth, referred to as a horizon. Alternatively, only some of the future branches are considered. It is also possible to consider only some of the future branches up to a specified horizon.

In other embodiments it is possible to weight the future branches, or associate probability values with the future branches of the workflow. For example, when the workflow information is provided to the system this may include such weights or probability information. The probability information may represent the chance of taking one path of the workflow in the future. However, it is not essential to use such probability information. For example, future paths may be equi-probable.

Figure 7:
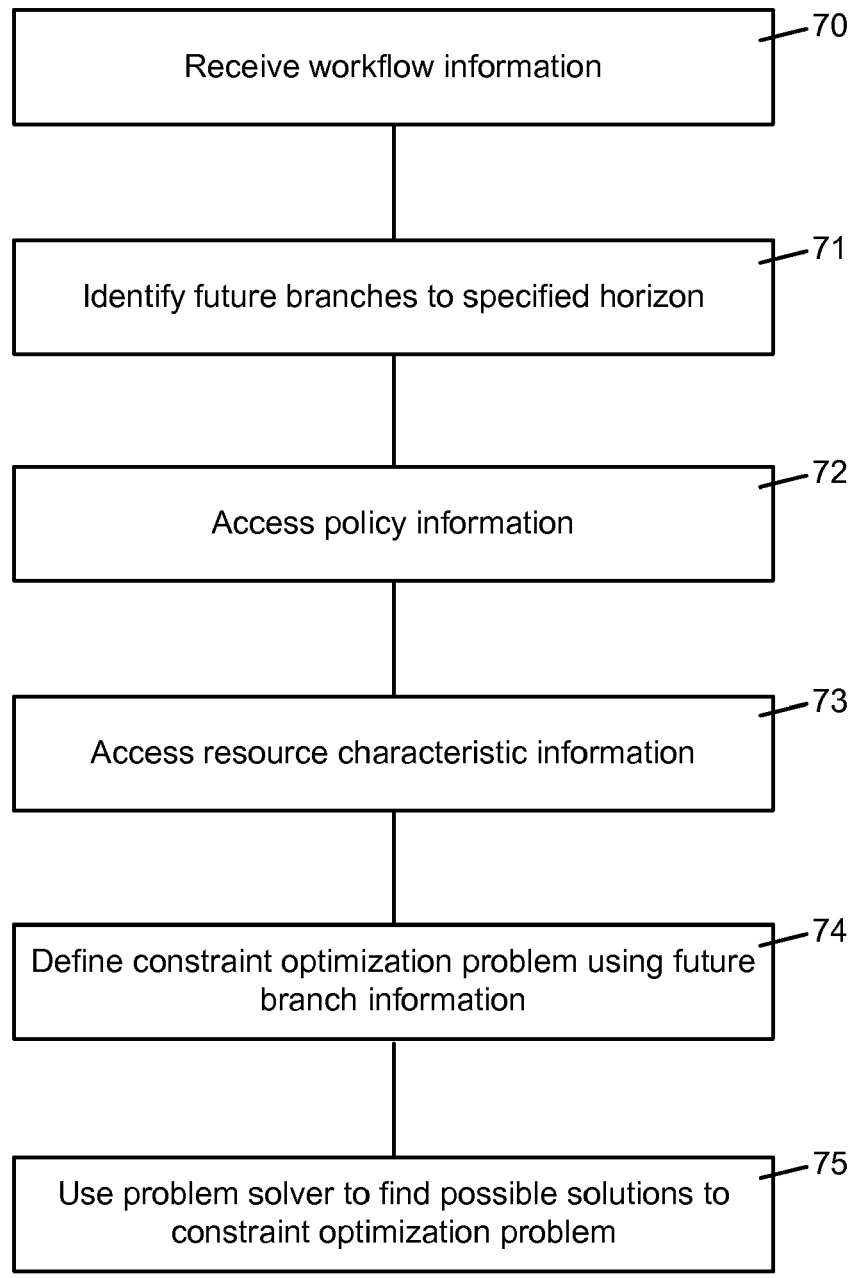
FIG. 7 is a flow diagram of a method of allocating resources to tasks in a workflow using future branch information.

FIG. 7 is a flow diagram of a method of allocating a resource to a task whilst taking future tasks into account. This flow diagram is similar to FIG. 3. Workflow information is received (box 70) and future branches of the workflow are identified (box 71) up to a specified horizon. For example, this is done using the scheduler 12. Policy information is accessed (box 72) and resource characteristic information is also accessed (box 73). At the scheduler a constraint optimization problem is then defined (box 74) using the future branch information. A problem solver is then used to find possible solutions to the constraint optimization problem. In this way a resource is allocated to a task. This resource may thus be the best according to the current policy function and according to the envisioned steps of the workflow. When probabilities are used, the resource may be the best according to the policy function and according to the envisioned steps of the workflow with a special consideration of the most probable futures.

In some embodiments it is possible to dynamically adjust the specified horizon during execution of a workflow. For example, towards the end of a workflow it may be appropriate to reduce the horizon whereas it may be more appropriate to use a longer horizon at the beginning of a workflow. Knowledge about the overall depth and structure of the workflow may be used to influence selection of the horizon dynamically.

The examples discussed above relate to a single workflow. However, it is also possible for the workflow engine to operate on more than one workflow at a time. This is achieved by repeating the methods described above for each workflow but using one apparatus as described with reference to FIG. 1.

Business processes and other processes are often cross-functional and involve the flow of information between several functional areas. For example, an order fulfillment process may require input from sales, logistics, manufacturing and finance as it progresses from sales order through production and payment. Existing workflow engines and architectures are able to model such cross-functional processes provided that the workflows precisely and accurately define the required inputs from the various different functions. Situations requiring the loose coordination of different processes cannot be successfully modeled using existing workflow engines.

For example, a consulting services wing of a large manufacturing enterprise may be highly dependent on information from the manufacturing divisions about future product releases. This may be addressed by integrating the workflows of the consulting services wing with those of the manufacturing divisions. However, this would result in a large and complex workflow that is difficult to work with and counterintuitive for staff in the different functional areas of the company.

Figure 8:
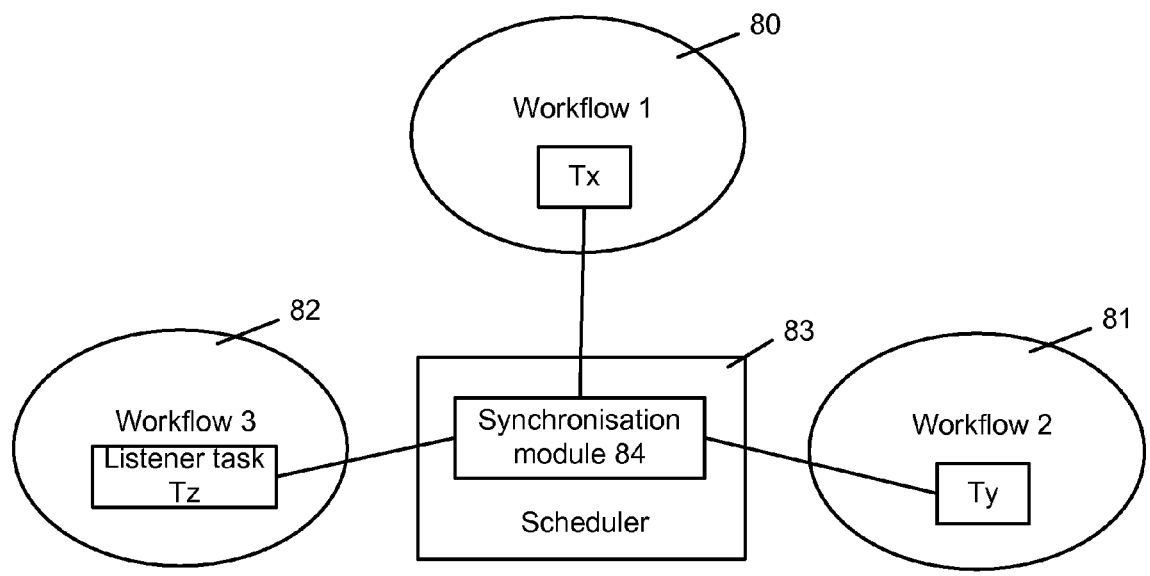
FIG. 8 is a schematic diagram of a synchronization module at a scheduler in a workflow engine.

FIG. 8 shows a synchronization module 84 which may be integrated with a scheduler 83 such as the scheduler 12 of FIG. 1. This synchronization module may be used to enable cross-workflow synchronization thus removing the need to integrate workflows of different functional divisions of a company for example. FIG. 8 shows three workflows 80, 81, 82 which are represented and are being scheduled or executed by the scheduler 83 which is part of a workflow engine such as the workflow engine 10 of FIG. 1. The workflow engine may be active for many more workflows but three are shown here for clarity. Workflow 1 comprises a plurality of tasks one of which is Tx and workflow 2 comprises a plurality of tasks one of which is Ty. Workflow 3 comprises a plurality of tasks and one of these Tz is dependent on tasks Tx and Ty in the other workflows. Tx and Ty are referred to herein as external tasks because these tasks are external to the workflow under consideration, workflow 3. Thus the term "external task" refers to any task in a workflow where that workflow is separate from the workflow currently being processed.

Figure 9A:
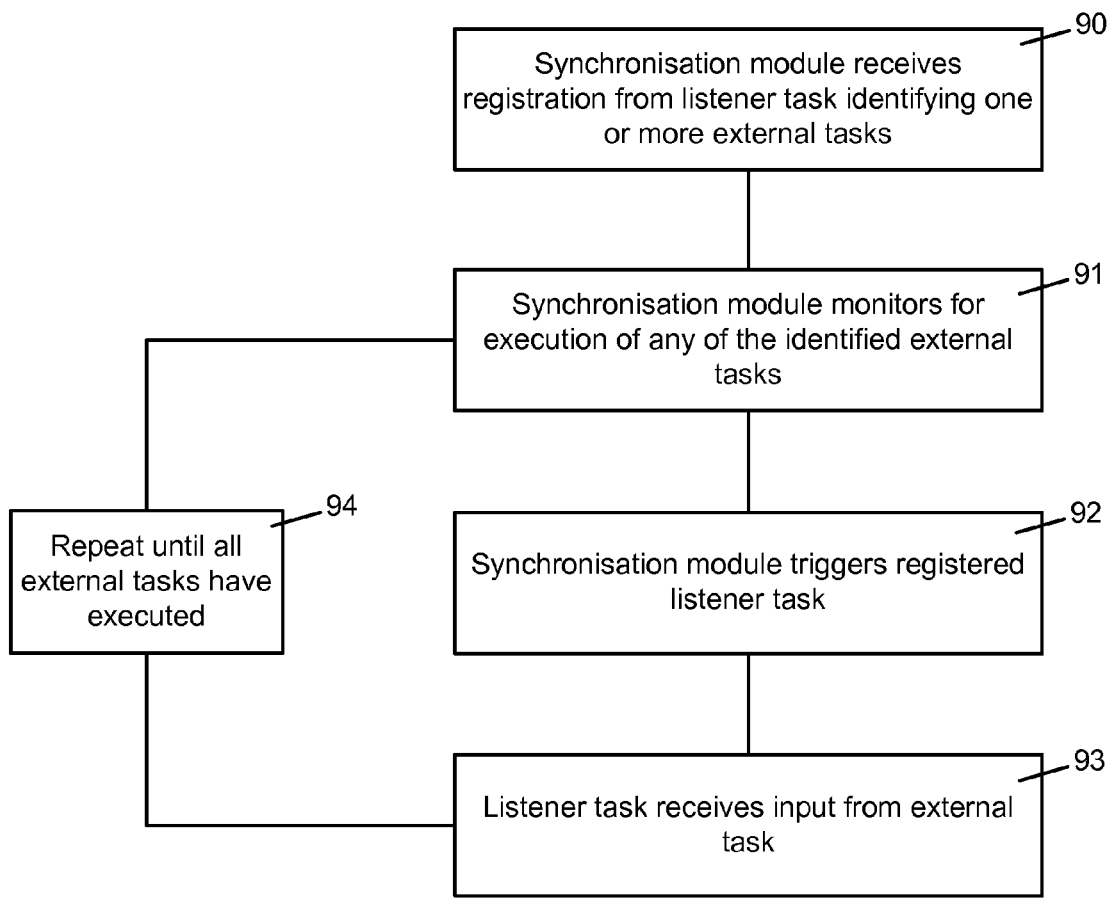
FIG. 9A is a flow diagram of a method of operation at the synchronization module of FIG. 8.

Task Tz in workflow 3 is referred to as a listener task where a "listener task" is one which is arranged to receive input from one or more external tasks. The synchronization module is arranged to receive a registration (see box 90 of FIG. 9A) from workflow 3 in this example, which identifies the listener task and also identifies the external tasks of that listener task. This registration may be represented as a task in workflow 3. The information about which external tasks apply is obtained from user input for example and may be provided with information about the workflow by a user. The synchronization module monitors (box 91) for execution of any of the identified external tasks, which in this case are Tx and Ty. If one of these external tasks becomes current for execution the synchronization module triggers the registered listener task (see box 92), Tz in this example. That listener task Tz then actively listens to the relevant external task and receives input (box 93) from that external task directly when that external task executes. This process then repeats (box 94) until all of the external tasks in the registration have executed.

In another embodiment information is accessed about the external tasks and reasoning is carried out to estimate start and end execution times for those tasks. These estimated times are then used to control monitoring by the synchronization module (for example, in box 91 of FIG. 9A) so that the periods of time when monitoring is required are reduced. This reduces demand on processing resources required by the synchronization module.

In another example, once the synchronization module receives a registration request, it checks whether the registration request is incompatible with any previous registrations that are still active. For example, incompatibility may arise where t1 is a listener task on workflow 1 listening to a second task t2 in workflow 2, and where an existing registration defines t2 as a listener of t1.

Figure 9B:
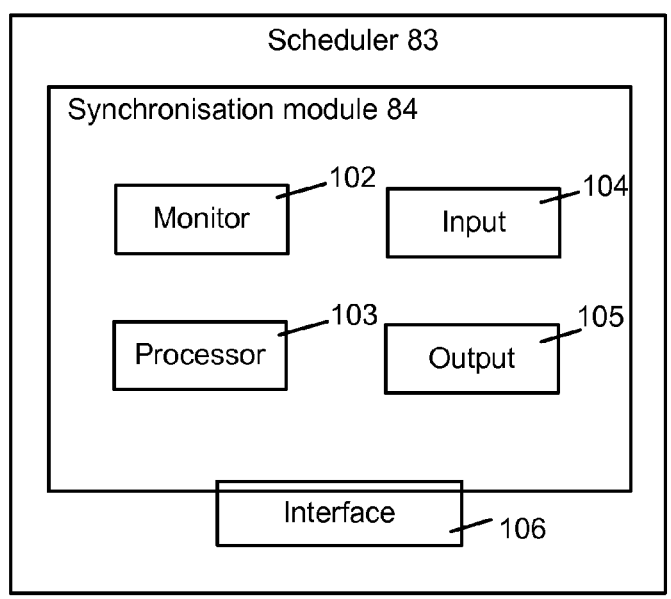
FIG. 9B is a schematic diagram of the synchronization module of FIG. 8 in more detail.

Thus the synchronization module 84, as illustrated in FIG. 9B, comprises an input 104 arranged to receive registrations from workflows about listener tasks. It also comprises an interface 106 to a scheduler 83. It comprises a monitor 102 arranged to monitor the scheduler via the interface for execution of any registered listener task. It also comprises an output 105 arranged to send trigger messages to the listener task. A processor 103 is also provided which may be arranged to receive or access information about registered external tasks and to estimate start and end execution times for those external tasks. Important addition: at registration, there is a check to be sure that the current synchronization pattern is not incompatible with previous one, i.e., this would avoid situations where t1 is a listerner task on workflow1 listening to a second task t2 in workflow2, and where a second request defines t2 as listener of t1.

Previously, it has been very difficult for managers or other operators to decide how best to improve the available pool of resources used for their workflows. For example, given particular workflows to be executed, how best should a manager spend a resource development budget to gain the optimal improvement/performance in terms of one or more specified criteria? Herein, this improvement in performance is referred to as increased robustness of a workflow. The criteria may be for example, workflow execution duration given various different circumstances. The circumstances may include breakdown of one or more resources or unavailability of one or more resources. The term "robustness of a workflow" is used herein to refer to the influence of detriments to a pool of resources on the performance of execution of a workflow using that pool of resources. The more robust a workflow, the better its ability to withstand detrimental changes to its associated pool of resources.

Figure 10:
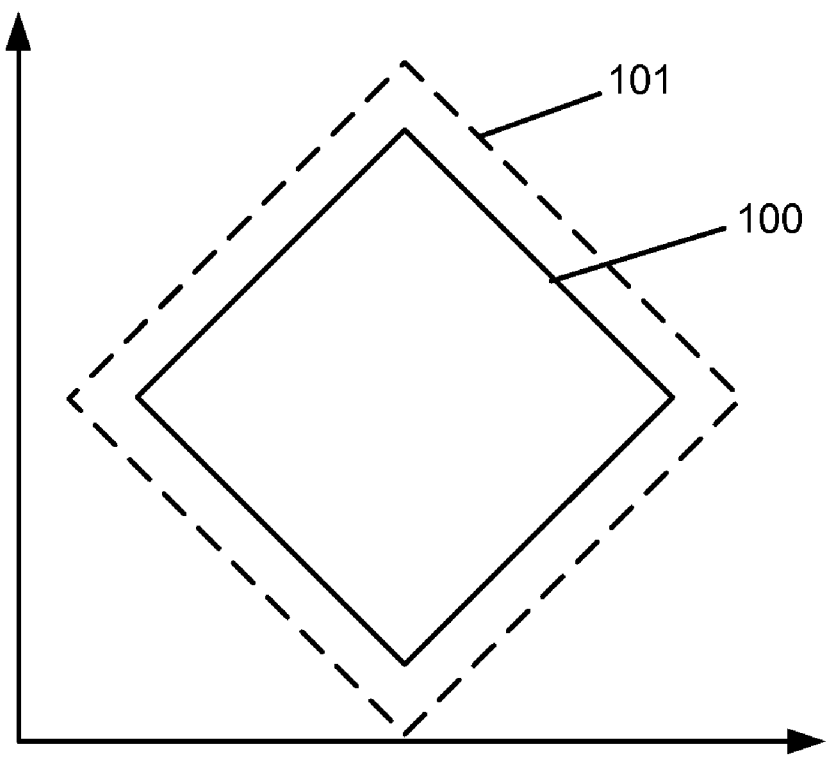
FIG. 10 is a schematic diagram of a solution space of a workflow.

In some embodiments of the present invention it is recognized that the size of the solution space for the problem of allocating resources to tasks in a workflow provides a useful indicator of robustness of a workflow. The solution space can be thought of as a set comprising all possible combinations of resources allocated to tasks in the workflow. In general, the greater the size of the solution space the more robust the workflow. This is illustrated in FIG. 10 which shows a solution space 100 for resource allocation in a given workflow with a specified resource pool. A solution space may be represented by using one axis of a graph for each variable of the problem and by selecting on each axis a set of values for the variables which are part of a solution. In the example of FIG. 10 we assume a two-variable problem. The solution space increases in size as indicated by the dotted line 101 for the same workflow and a different specified resource pool; here the workflow is said to be more robust. The resources of the two resource pools may have the same identity (e.g. be the same people on a staff team) and in that case, they have different resource characteristics (for example, one resource pool represents the team before staff training and one afterwards). By using a constraint programming model of a problem, a representation of that problem is obtained which is suited to easily enable details about a corresponding solution space to be obtained. Thus in the case that a workflow engine uses constraint programming techniques rather than conventional rule-based techniques, solution space information may be more easily obtained.

Figure 11:
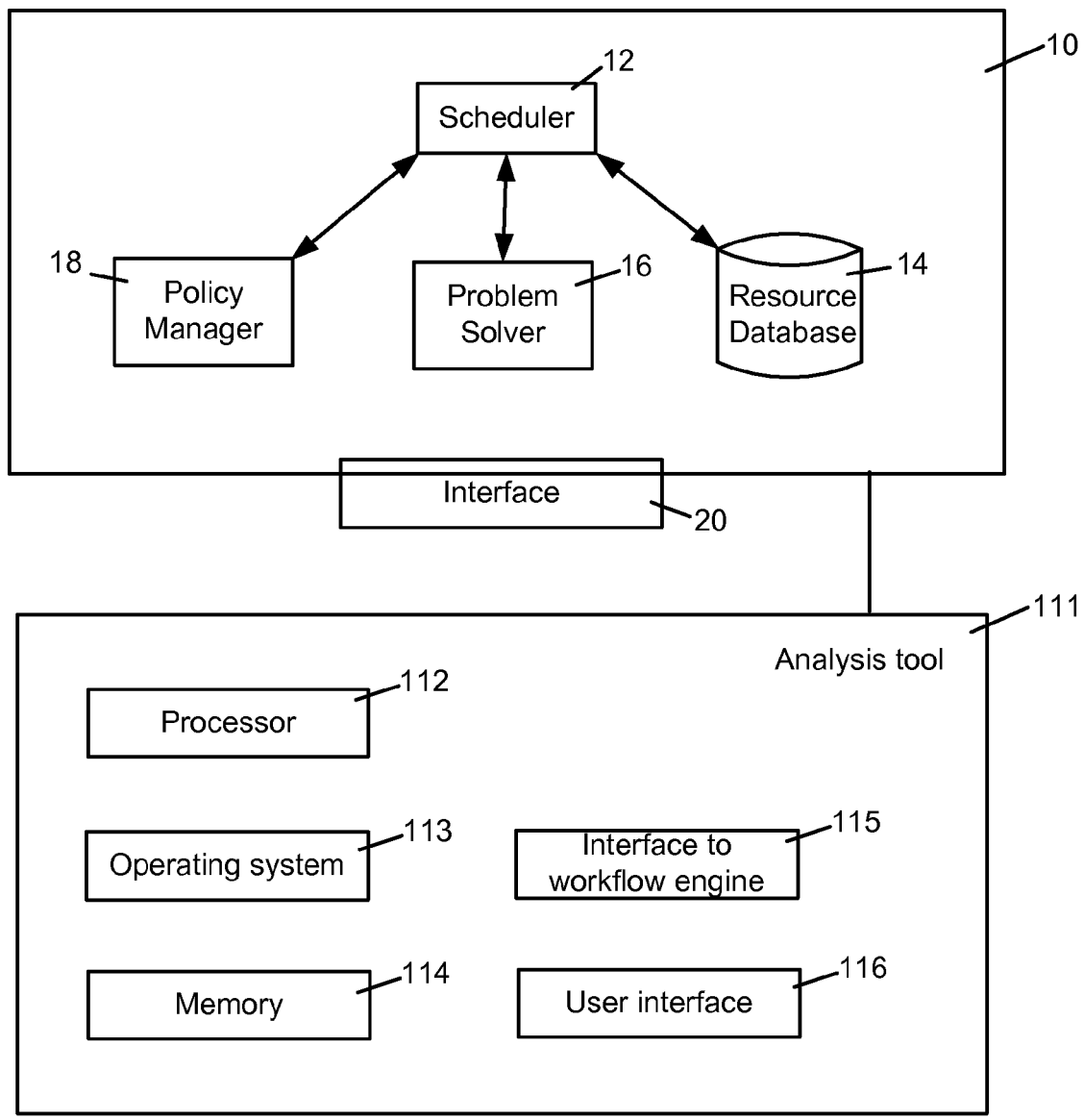
FIG. 11 is a schematic diagram of an analysis tool.

In some embodiments an analysis tool 111 is provided connected to the workflow engine 10 as illustrated in FIG. 11. The analysis tool comprises a processor 112 of any suitable type being arranged to access and use information about the workflows being considered by the workflow engine 10 via an interface 115. The analysis tool also comprises an operating system 113 of any suitable type, a memory 114 and a user interface 116.

Figure 12:
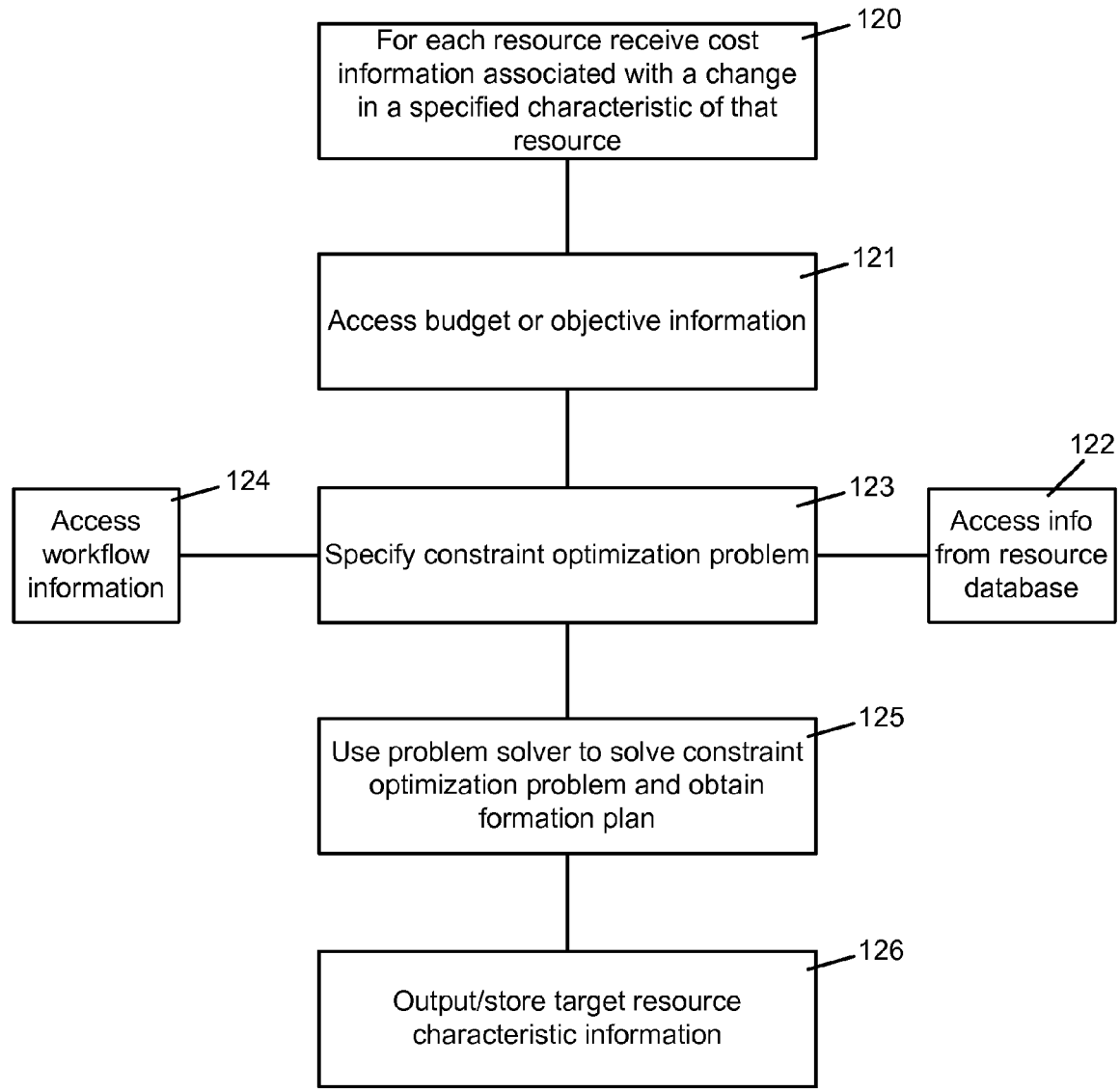
FIG. 12 is a flow diagram of a method of operation at the analysis tool of FIG. 11.

FIG. 12 is a flow diagram of a method of operation at the analysis tool 11 of FIG. 11. This method may be carried out offline, i.e., independently of the execution of workflows. However, this is not essential. The analysis may also be carried out in parallel with, or in conjunction with, the resource allocation process.

Optionally, cost information is received for each resource (box 120). For example, this information is pre-specified by an operator or is actively obtained by searching a database, the internet or other knowledge base. The cost information may be of any suitable type such as monetary information or cost in terms of any other measure such as processing time, processing capacity or other factor. In some embodiments the cost information comprises the cost of increasing the skill level of a human resource for a specified skill and a specified skill level increase. It is also possible for the cost information to comprise the cost of upgrading a specified piece of equipment in a specified manner. The cost information can be said to be associated with a change in a specified resource characteristic of a resource.

Information about one or more objectives that are desired is accessed (see box 121). For example, this may comprise a monetary budget for maintaining and/or upgrading machinery at a factory. Alternatively, it may comprise a monetary budget for staff training at a given department in an enterprise. The information about objectives may also comprise for example, details of workflow requirements in terms of execution duration (e.g. aim to execute the workflow as quickly as possible), and/or ability to cope with failure of one or more resources and other such objectives.

The analysis tool 111 also accesses information about a workflow to be analyzed (box 124). For example, this may comprise the representation of that workflow at the scheduler in the workflow engine 10 and/or information about resource characteristics from the resource database for a specified pool of resources (box 122) that may be used by the workflow engine 10. As mentioned above the representation of a workflow at the scheduler comprises details of which tasks are in the workflow, at least a partial order for those tasks and, for each task, information about required resource characteristics.

The analysis tool 111 then specifies a constraint optimization problem (box 123) using the information it has accessed. It is required to find how best to modify the resource characteristics of resources in the resource pool to maximize the objectives. The objectives are assumed to be met by maximizing the size of the solution space for the workflow as mentioned above. In addition, the objectives may be modeled in the constraint optimization problem (i.e., a constraint optimization problem where the solution maximizes some quality function or minimizes some cost function) by specifying weights to be applied during the constraint optimization process. This constraint optimization problem may be specified as finding target resource characteristics for each resource in the resource pool such that, if those target resource characteristics are implemented, the objectives are optimized. It is also possible to find a target number of resources for the resource pool as part of this process. For example, the solution may recommend hiring more staff or replacing staff with others having different resource characteristics (such as skills and skill levels) or giving more skills to existing staff.

Using the information that it has accessed, the analysis tool specifies a constraint optimization problem (box 123) to find target resource characteristics for resources in the resource pool such that the objectives are optimized. In one embodiment the constraint optimization problem finds two values for each resource and represents this using a set of three values (also referred to as a tuple) for each resource. For example, each tuple comprises a value identifying a resource, a value specifying a target skill of that resource and a value specifying a target skill level of the specified skill. For example, the resource may be a patent attorney who is able to draft patent specifications for chemical inventions with a target skill level of expert. In that case the tuple may be (Jane, chemical, expert). There may be more than one such tuple for each resource. For example, Jane may also be able to draft patent specifications for mechanical inventions with a target skill level of intermediate. In that case the tuple may be (Jane, mechanical, intermediate).

The constraint optimization problem is specified to find a set of tuples which maximizes the size of a solution space for the workflow concerned. Weights may be introduced to bias the reasoning towards specified tasks, for example, critical business processes. These weights may be specified by an operator or may be pre-configured.

The analysis tool 111 instructs the problem solver in the workflow engine 10 (or any other suitable problem solver) to find a solution to the constraint optimization problem (box 125). The solution, comprising target resource characteristic information, is stored in memory or output to a user interface or any other suitable output (box 126).

The target resource characteristic information is extremely useful, for example, for managers of business processes, factories, document management processes, or other processes. It enables efficient and optimal provisioning of resources pools for workflow execution according to specified objectives. This may save costs, management time, improve productivity, and in the case of human resources, may improve management of those resources.

An example is now described in which the workflow engine 10 is arranged to operate using Microsoft's Windows Workflow Foundation™ technology. However, it is not essential to use Windows Workflow Foundation (WWF); any suitable workflow scheduling technology may be used.

In Windows Workflow Foundation (WWF), a workflow is a collection of tasks structured with connectors allowing their sequential, parallel, conditional, or repetitive execution. A Windows Workflow Foundation scheduler manages the state of each active workflow and launches the tasks according to the structure of the process. A task can either be a computer program or an action executed by an external agent, e.g. employee. Tasks can take seconds or days to be executed depending on their nature.

Using WWF, each workflow may be represented as a task or a plurality of tasks. Each task may store dedicated information through programmatically defined properties. For example, if a task is assigned to a specific person, a property of the workflow can store the name of that person. The example now described uses this ability to integrate decision variables related to the smart allocation process.

In this example, the resource database 14 comprises information about resources. This includes skills of each resource, tasks that are assigned to resources, an agenda, and a geographic location for each resource.

In this example, the policy manager 18 looks after preferences on the resource allocations. It allows, for instance, to favor resource allocations involving some skill refreshing, leading to a fair distribution of the workload over the employees, or simply optimizing the use of the resources to minimize the make-span of each workflow. The policy manager may give priorities to some preferences based on a weighting system.

A constraint optimization problem is formed whose solution space is equivalent to every possible execution of the workflows. Additional soft-constraints ensure that the resource allocation satisfies any policies. The constraint optimization problem is created from three sources of information: workflow properties, the resource database, and the policies selected by the policy manager.

In this example, WWF is used to provide the scheduler 12 of FIG. 1. Before executing a task, WWF at the scheduler checks if the task's resource is allocated. If it is not, a constraint optimization problem is generated on the fly based on the current states of the workflows, the availability of the resources, and the resource allocation policies. The solver 16 finds the best resource allocation for the task based on the policies and assigns the task to this resource.

When planning an activity, the system 10 may select a resource based on the current workload of each resource and based on the future actions that require to be planned. Since the workflows might be very long and some activity might not be visited before a long while, the planning only takes into account the activity within a given horizon. This horizon is the number of tasks we look ahead in order to assign a resource to the current task.

More detail about a workflow model used by the scheduler 12 for the present example is now given.

For every task WT in the workflow pre-configured information is available to the scheduler 12 as now set out.

| Variable Name | Description |
| --- | --- |
| WT.ProcTime | Expected processing time. |
| WT.StartTime | Starting time (unassigned if the task has not been started) |
| WT.EndTime | Ending time (unassigned if the task has not been completed) |
| WT.Skills | A skill vector indicating, for each skill, the required level to accomplish the task. |

-continued

| Variable Name | Description |
|---|---|
| WT.Done | True if the task is completed, false otherwise. |
| WT.Available | True if the task might eventually be executed, false otherwise. |
| WT.Resource | Resource used to accomplish the task. This property might be unassigned if the task has not been attributed to a resource yet but must be assigned before the execution of the task. |

The resource database 14 is arranged in this example so that, for each resource R in the database, one can retrieve a skill vector R.Skills. Each component of this vector indicates the skill level for a specific skill. For instance, the skill vector of a computer consultant may be:

| .NET | SQL | C++ | Networking | Billing |
|---|---|---|---|---|
| 3 | 3 | 1 | 2 | 0 |

In addition to the skill levels, a resource R has an agenda of tasks that have been assigned to R. These tasks are denoted as R.Tasks.

Additional information about resources may be stored in the database 14. For instance, the geographical position R.Position of each employee resource may be relevant.

Using properties, it is possible to store information about the structure of workflows. For instance, in an If-Else statement, it is possible to store the probability that a workflow branches on an if statement and therefore, the probability that it branches on the else statement. These probabilities may be computed from the history of past executions of the workflow saved in a WWF database. The probabilities may be used to better predict the execution of a workflow. If the probabilities are unknown, a uniform distribution over the different choices may be used.

As mentioned above the scheduler 12 is arranged to specify a constraint optimisation problem when it is required to allocate resources to a task. In order to do this a constraint satisfaction problem (CSP) model is used whose solution space corresponds to all possible walks through the workflows. The solution space is given by hard constraints together with soft constraints for optimization purposes. The soft constraints, when violated, only deteriorate the objective value. The feasibility of the solution is not compromised.

Variables for the CSP model are now described. For every workflow task WT, a task T is declared in the CSP model whose members comprise the following constrained variables.

| Variable Name | Description | Initial Domain |
|---|---|---|
| T.StartTime | Estimated starting time | {WT.StartTime} if WT.StartTime is assigned. [0, ∞] otherwise. |
| T.EndTime | Estimated ending time | {WT.EndTime} if WT.EndTime is assigned, [0, ∞] otherwise. |
| T.Available | 1 if the task might eventually be executed, 0 otherwise. | {0} if not WT.Available, {1} if WT.Done, {0, 1} otherwise. |
| T.Resource | Resource that will accomplish the task. | {WT.Resource} if WT.Resource is assigned, {R | R.Skills ≧ WT.Skills} ∪ [{Null} otherwise. |

Examples of hard constraints based on the structure of the workflow are now described. For every single activity the following constraint may be used:

$$T_1.\text{EndTime} = T_1.\text{StartTime} + T_1.\text{Available} \times WT_1.\text{ProcTime} \tag{1}$$

For any two activities forming a sequence the following constraints may be used:

$$T_1.\text{Available} = T_2.\text{Available} \tag{2}$$

$$T_2\text{StartTime} \geq T_1.\text{EndTime} \tag{3}$$

For activities executed in parallel the following constraints may be used:

$$T_1.\text{Available} = T_2.\text{Available} = T_3.\text{Available} = T_4.\text{Available} \tag{4}$$

$$T_2.\text{StartTime} \geq T_1.\text{EndTime} \tag{5}$$

$$T_3.\text{StartTime} \geq T_1.\text{EndTime} \tag{6}$$

$$T_4.\text{StartTime} \geq \max(T_2.\text{EndTime}, T_3.\text{EndTime}) \tag{7}$$

A workflow might have to branch on a specific activity depending on the event it receives. This is modeled with a Listen-Activity block in the Windows Workflow Foundation. The following constraints apply to the activities in this block.

$$T_1.\text{Availabe} = T_2.\text{Available} + T_3.\text{Available} = T_4.\text{Available} \tag{8}$$

$$T_2.\text{StartTime} \geq T_1.\text{EndTime} \tag{9}$$

$$T_3.\text{StartTime} \geq T_1.\text{EndTime} \tag{10}$$

$$T_4.\text{StartTime} \geq \max(T_2.\text{EndTime}, T_3.\text{EndTime}) \tag{11}$$

A workflow can also branch according to an if statement. In that case, the following constraints apply.

$$T_1.\text{Available} = T_2.\text{Available} + T_3.\text{Available} = T_4.\text{Available} \tag{12}$$

$$T_2.\text{StartTime} \geq T_1.\text{EndTime} \tag{13}$$

$$T_3\text{StartTime} \geq T_1.\text{EndTime} \tag{14}$$

$$T_4.\text{StartTime} \geq \max(T_2.\text{EndTime}, T_3.\text{EndTime}) \tag{15}$$

$$C \Leftrightarrow T_2.\text{Available} = 1 \tag{16}$$

WWF supports composite activities. These activities are built from other activities that form a sub-workflow. The CSP is specified by replacing all composite activities by a decomposition into atomic activities. If a composite activity contains other composite activities, the CSP model is constructed by recursively replacing composite activities by atomic activities.

WWF also supports loops. The while loop tests a condition before executing a sub-workflow and keeps executing this sub-workflow until the condition becomes false.

Some examples of constraints that may be used to model the use of the resources are now given. Notice that according to the initial domain of $T_i$.Resource, only resources with the proper skills may be allocated to a task. There is also a special resource called the Null resource. The resource is allocated to tasks that are not executed. The following constraint models the use of the Null resource.

$$T_i.\text{Resource} = \text{Null} \Leftrightarrow T_i.\text{Available} = 0 \tag{17}$$

When sharing the same resource, two tasks cannot be executed at the same time. This is modeled with the following constraint. This will not preclude a human resource to balance its time between multiple assignation and this constraint is only used to report the cumulative use of the resources.

$$T_i.Resource=T_j.Resource \rightarrow T_i.EndTime \geq T_j.StartTime \\ VT_j.EndTime \leq T_i.StartTime \quad (18)$$

A list of tasks is pre-assigned to each resource. This list is denoted by R.T asks. In an example, each resource executes the tasks using a FIFO policy (first in first out). Therefore, if a task is assigned to a resource R, the task will not be executed until all other tasks in R.T asks are completed. This is expressed using the following constraint. Notice that in this constraint, Ti.Resource and Ti.StartTime are the two only variables. All other terms are constants.

$$T_i.Resource = R \rightarrow T_i.StartTime \geq \\ \sum_{T_j \in R.Tasks} T_j.ProcTime + CurrentTime - \min_{T_j \in R.Tasks} T_j.StartTime \quad (19)$$

Examples of soft constraints expressing preferences on the solution that is desired to obtain are now given. These constraints generally map a property of the solution to an integer variable on which it is required to minimize (or maximize) the value.

The modelling may directly filter-out non-properly qualified resources.

The resource allocation solution may be required to spread the workload between the different resources. For instance, to avoid overloading a resource A while resource B is idle. The workload W(R) of a resource R may be defined as the processing time of the tasks assigned to this resource. More formally, this is specified as $$W(R) = \sum_{T_i \in R.Tasks} T_i.ProcTime + \sum_{T_{ie}.Resource=R} T_i.ProcTime \quad (20)$$

Two different techniques may be used to spread the workload over the resources. The simplest one is to minimize the maximum workload. In this case, the following optimization problem is solved.

$$\min M \quad (21)$$

$$M \geq W(R_i) \forall R_i \quad (22)$$

This solution is simple as it only involves standard binary constraints. Unfortunately, the workload vectors for three resources [10, 8, 6] and [10, 7, 7] are equivalent since the maximum workload is 10 in both cases. Clearly, the vector [10, 7, 7] is a better solution since it better spreads the workload over the second and the third resource.

This issue may be addressed by introducing a spread constraint as described by Pesant and Regin "Spread: A Balancing Constraint Based on Statistics" in Peter van Beek, editor, CP, volume 3709 of Lecture Notes in Computer Science, pages 460-474, Springer 2005. The expression SPREAD $([X_1, \ldots, X_n], E, \sigma)$ is satisfied if E is the mean and $\sigma$ the standard deviation of the sample $X_1, \ldots, X_n$. The workload can be spread over the resources using the following constraints.

$$\min \sigma \quad (23)$$

$$SPREAD([W(R_1), \ldots, W(R_n)], E, \sigma) \quad (24)$$

$$0 \leq E < \infty \quad (25)$$

In the above example, two different solutions for distributing the workload over the different resources have been given. Many other solutions might exist. The architecture presented in this document is flexible enough to support new or enhanced models that may better address the needs of a particular organization.

Skill refreshing consists of assigning tasks to resources that have not used a required skill for a long time. An example is now given for computing the resource allocation that maximizes skill refreshing.

Let f(R, T) be a function that returns the skill refreshment gain if task T is assigned to resource R. The total skill refreshing is represented by S which it is required to maximize.

$$\max S \quad (26)$$

$$S = \sum_{T_l} f(T_i.Resource, T_i) \quad (27)$$

A resource must satisfy the required skills in order to accomplish a task. However, it may be undesirable to assign an over-qualified resource to a task. In this case a better solution may be to keep this resource available for more demanding tasks. A variable Q may be defined as below, evaluating the degree of over-qualified allocations in an assignment. It is required to minimize Q.

$$\min Q \quad (28)$$

$$Q = \sum_T \sum_i T.Resource.Skills[i] - T.Skills[i] \quad (29)$$

The example workflow engine architecture described herein may handle many other policies. For instance, one might want to minimize the traveled distance of a team of consultants that need to move to accomplish tasks. This may be done by affecting a start up cost between each pair (Task, Resource). In this example, it is required to minimize the sum of the start-up costs for every pair of tasks and resources.

All policies may be encoded with soft constraints that map the quality of a solution to a variable called a cost variable. Methods described herein may find the best resource allocation subject to multiple policies by minimizing (or maximizing) a weighted sum over all cost variables. A user may provide these weights dynamically according to the importance given to each policy.

Details about how the model described above may be used to solve a resource allocation problem in workflows are now given. Workflow optimization is a complex problem. It might involve many tasks to schedule with multiple resources. Moreover, the processing time given for each task is only an estimate and therefore scheduling on a long term basis becomes inaccurate. The number of tasks to schedule and the inaccuracy for long term prediction is a challenge.

Uncertainty in workflows represents another challenge. Some activities are conditional to events that cannot be predicted and therefore prevent a precise schedule from being derived. This is the case for the Listen-Activity blocks, if-else statements, and while loops. It is often not possible to predict which event will occur first, if the condition will be true or not, or how many times the while loop will be executed. An example is now given of finding the best resource allocation despite this uncertainty.

In order to reduce the combinatorial search space, a horizon is specified. The tasks beyond a given horizon h from the tasks that are currently being executed are temporarily ignored. Their corresponding variables are not included in the CSP.

There exist different ways to visit a workflow. For instance, there are two ways to walk through a if-else statement: by visiting the if branch or the else branch. Consider the binary vector $S=[T_1.\text{Available}, \ldots, T_n.\text{Available}]$. Any such binary vector that satisfies the structural constraints represent a valid walk in the workflow. These walks are referred to herein as scenarios.

Scenarios depend on branching activities: the Listen-Activity blocks, the If-Else statements, and the loops. A probability is assigned on each of these activity branches. For instance, in the case of an If-Else statement, a probability p is assigned that the condition is true and therefore a probability 1−p that the condition is false. Based on these probabilities, the probability p(S) that a scenario S occurs is computed.

Assume, without loss of generality, that it is required to find the best resource allocation for task $T_1$. Let $C_i^j$ be the cost of the best solution for scenario $S_i$ such that $T_1.\text{Resource}=R_j$. $T_1$ is then allocated to the resource $R_j$ that minimizes the following expression.

$$\sum_{S_i} p(S_i)C_i^j \qquad (30)$$

Notice that this solution implies solving s×r different CSPs where s is the numbers of scenarios and r the number of resources available for task $T_1$.

Figure 13:
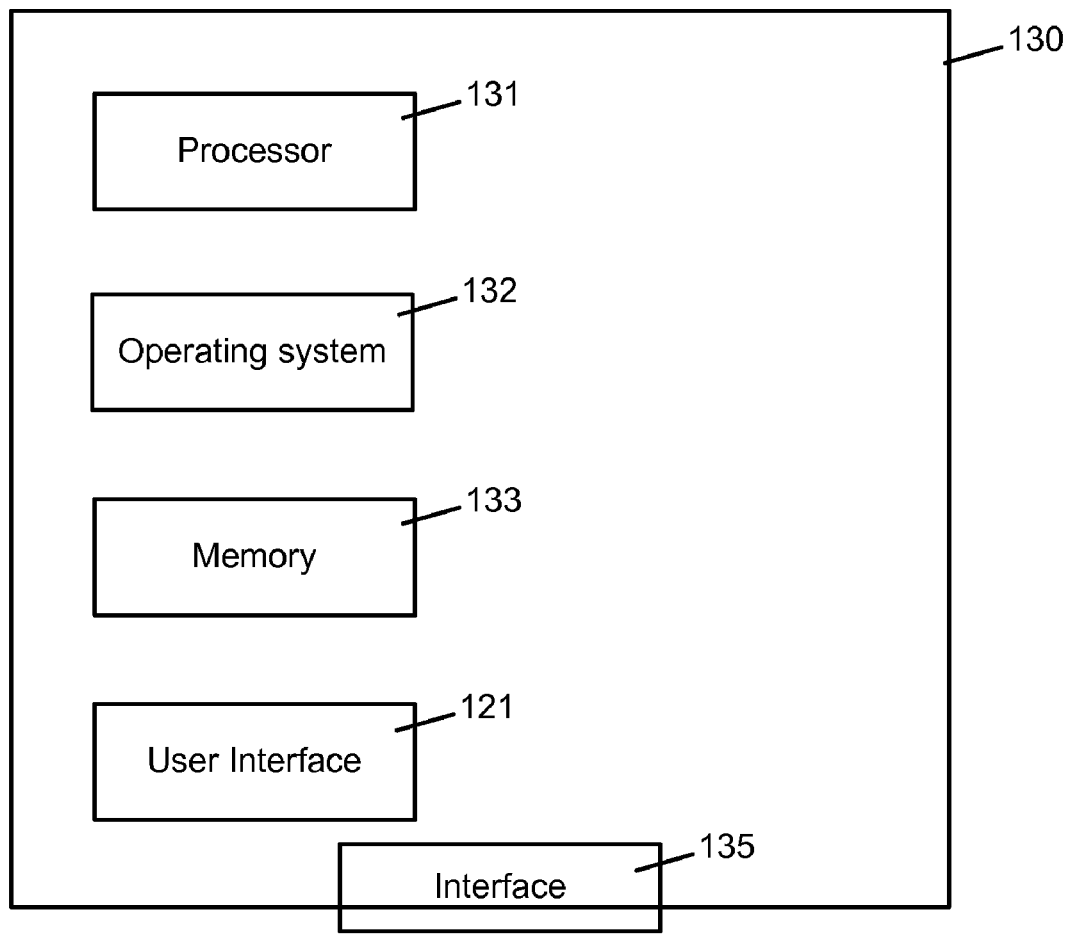
FIG. 13 is a schematic diagram of an apparatus for implementing a workflow engine or analysis tool.

FIG. 13 is a schematic diagram of an apparatus 130 for implementing the workflow engine 10 or analysis tool 111. The apparatus 130 comprises a processor 131 which may be a computer or any other suitable type of processor. An operating system 132 and any other suitable platform software is provided on the processor to enable software implementing any of the methods and systems described herein to be executed on the processor 132. A memory 133 is also provided of any suitable type and optionally a user interface 134 is given, such as a graphical user interface to enable an operator to control the system. A interface 135 enables the apparatus to be integrated or connected to other systems and/or enables inputs and outputs to be made from the apparatus. For example, in the case of the analysis tool 111 the interface may enable connection to a workflow engine. In the case of a workflow engine, the interface may be to other systems for effecting workflow execution.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

The steps of the methods described herein may be carried out in any suitable order, or simultaneously where appropriate.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method comprising:
   under control of one or more processors configured with executable instructions:
   accessing objectives associated with execution of a workflow comprising a plurality of tasks that are combined to form the workflow;
   accessing information about a solution space, the solution space being for allocation of resources from a resource pool to tasks in the workflow in view of policy information;
   specifying a constraint optimization problem to find target resource characteristics for resources of the resource pool, the constraint optimization problem being specified such that the allocation of resources is based in part on assigning tasks to a worker that has not used a required skill set within a specified period of time;
   sending the specified constraint optimization problem to a constraint programming problem solver;
   receiving a response comprising target resource characteristics for resources of the resource pool; and
   storing the target resource characteristics in memory.

2. A method as claimed in claim 1 which further comprises accessing cost information comprising, for each resource in the resource pool, a cost associated with making a specified change to a resource characteristic of that resource.

3. A method as claimed in claim 1 wherein the accessed information about objectives comprises information about a budget for changing resource characteristics of resources in the resource pool.

4. A method as claimed in claim 2 wherein the accessed information about objectives comprises information about a budget for changing resource characteristics of resources in the resource pool.

5. A method as claimed in claim 3 wherein the budget is a training budget for changing skill levels of human resources in the resource pool.

6. A method as claimed in claim 1 wherein the step of accessing information about the solution space is carried out after the associated allocation of resources from a resource pool to tasks in the workflow.

7. A method as claimed in claim 1 wherein the step of specifying the constraint optimization problem comprises specifying at least one constraint on the basis of the structure of the workflow.

8. A method as claimed in claim 1 which is carried out at an analysis tool in communication with a workflow engine having a constraint programming problem solver and wherein the information about the solution space is accessed from the workflow engine and wherein the specified constraint optimization problem is sent to the constraint programming problem solver at the workflow engine.

9. A method as claimed in claim 1 which is carried out at an analysis tool connected to a workflow engine having a constraint programming problem solver and wherein the step of accessing information about the solution space comprises using the workflow engine to allocate resources to tasks of the workflow such that the associated solution space is identified.

10. A method comprising:
under control of one or more processors configured with executable instructions:
accessing objectives associated with execution of a workflow comprising a plurality of tasks;
computing information about a constraint programming solution space, the solution space being for allocation of resources from a resource pool to tasks in the workflow in view of policy information;
accessing cost information comprising, for each resource in the resource pool, a plurality of costs associated with making changes to resource characteristics of each resource and a budget for changing resource characteristics of resources in the resource pool;
specifying a constraint optimization problem to find target resource characteristics for resources of the resource pool, that constraint optimization problem being specified such that the allocation of resources is based in part on assigning tasks to a worker that has not used a required skill set within a specified period of time;
using a constraint programming problem solver to find a solution to the specified constraint optimization problem comprising target resource characteristics for resources of the resource pool; and
storing the target resource characteristics in memory.

11. A method as claimed in claim 10 wherein the step of computing information about the constraint programming solution space is carried out after the associated allocation of resources from a resource pool to tasks in the workflow.

12. A method as claimed in claim 10 wherein the step of specifying the constraint optimization problem comprises specifying at least one constraint on the basis of the structure of the workflow.

13. A system comprising:
an interface arranged to access information about objectives associated with execution of a workflow comprising a plurality of tasks, the interface also being arranged to access information about a solution space, that solution space being for allocation of resources from a resource pool to tasks in the workflow in view of specified policy information;
a processor arranged to specify a constraint optimization problem to find target resource characteristics for resources of the resource pool, the processor being arranged to specify the constraint optimization problem such that the allocation of resources is based in part on assigning tasks to a worker that has not used a required skill set within specified a period of time;
the interface being arranged to send the specified constraint optimization problem to a constraint programming problem solver and receiving a response comprising target resource characteristics for resources of the resource pool; and
a memory arranged to store the target resource characteristics.

14. The system as claimed in claim 13 further comprising a workflow engine having a constraint programming problem solver.

15. The system as claimed in claim 14 wherein the interface is arranged to access information about the solution space from the workflow engine and wherein the interface is arranged to send the specified constraint optimization problem to the constraint programming problem solver.

16. The system as claimed in claim 13 wherein the interface is arranged to be connected to a workflow engine having a constraint programming problem solver.

* * * * *